United States Patent
Culpi et al.

(10) Patent No.: US 11,888,415 B2
(45) Date of Patent: Jan. 30, 2024

(54) PIEZOELECTRIC STICK-SLIP-MOTOR AND METHOD OF CONTROLLING SAME

(71) Applicant: Physik Instrumente (PI) GmbH & Co. KG, Karlsruhe (DE)

(72) Inventors: William Culpi, Lake Forest, CA (US); Jerome Kneipp, Sundhoffen (FR)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 156 days.

(21) Appl. No.: 17/640,142

(22) PCT Filed: Aug. 25, 2020

(86) PCT No.: PCT/EP2020/073749
§ 371 (c)(1),
(2) Date: Mar. 3, 2022

(87) PCT Pub. No.: WO2021/043636
PCT Pub. Date: Mar. 11, 2021

(65) Prior Publication Data
US 2022/0321030 A1    Oct. 6, 2022

(30) Foreign Application Priority Data
Sep. 6, 2019    (EP) .................................... 19195819

(51) Int. Cl.
H02N 2/06    (2006.01)
H02N 2/02    (2006.01)

(52) U.S. Cl.
CPC ............. *H02N 2/062* (2013.01); *H02N 2/025* (2013.01)

(58) Field of Classification Search
CPC ........... H02N 2/062; H02N 2/025; H02N 2/06
See application file for complete search history.

(56) References Cited

U.S. PATENT DOCUMENTS 6,218,764 B1    4/2001    Yoshida et al.
6,246,151 B1    6/2001    Nakano
(Continued)

FOREIGN PATENT DOCUMENTS

EP    3120449 B1    5/2018
JP    H10337056 A    12/1998
(Continued)

OTHER PUBLICATIONS

Office Action (Notice of Grounds of Rejection) dated Mar. 22, 2023, by the Japanese Patent Office in corresponding Japanese Patent Application No. 2022-514746, and an English Translation of the Office Action. (11 pages).
(Continued)

*Primary Examiner* — Emily P Pham
(74) *Attorney, Agent, or Firm* — BUCHANAN INGERSOLL & ROONEY PC

(57) ABSTRACT

The present disclosure relates to a piezoelectric stick-slip-motor and control method. An exemplary method to enable speed variation of the piezoelectric stick-slip-motor with a reduced noise generation, includes: applying a cyclic sawtooth-waveform drive voltage signal with a constant frequency in which the drive voltage (V) increases to and decreases from a peak voltage (Vp) for operating the motor with a constant speed; and changing the motor speed by gradually increasing or decreasing the gradient (dV/dt) of increasing the drive voltage (V) to the peak voltage (Vp) with each subsequent sawtooth-waveform drive voltage signal cycle (C) while keeping the frequency of the drive voltage signal constant.

20 Claims, 1 Drawing Sheet

(56) References Cited

U.S. PATENT DOCUMENTS

| | | | |
|---|---|---|---|
| 6,545,389 B1 | 4/2003 | Yoshida | |
| 6,703,762 B1 | 3/2004 | Okada | |
| 7,061,745 B2 * | 6/2006 | Funk | H01G 5/14 361/290 |
| 11,349,413 B2 | 5/2022 | Koc et al. | |
| 2010/0314970 A1 | 12/2010 | Culpi et al. | |
| 2015/0076965 A1 | 3/2015 | Culpi | |
| 2017/0099017 A1 | 4/2017 | Hübner | |
| 2019/0068083 A1 | 2/2019 | Reith | |
| 2020/0204088 A1 | 6/2020 | Koc et al. | |

FOREIGN PATENT DOCUMENTS

| | | | |
|---|---|---|---|
| JP | H11103583 A | 4/1999 | |
| JP | H11146671 A | 5/1999 | |
| JP | H11289780 A | 10/1999 | |
| JP | 2000184761 A | 6/2000 | |
| JP | 2001025272 A | 1/2001 | |
| JP | 2002095272 A | 3/2002 | |
| JP | 2016533159 A | 10/2016 | |
| JP | 2020528726 A | 9/2020 | |
| WO | 2017137044 A1 | 8/2017 | |
| WO | 2018134637 A1 | 7/2018 | |
| WO | 2019020658 A1 | 1/2019 | |

OTHER PUBLICATIONS

European Search Report for European Application No. 19195819.8 dated Mar. 12, 2020 (5 pages).

International Search Report (PCT/ISA/210) and Written Opinion (PCT/ISA/237) dated Nov. 24, 2020, by the European Patent Office as the International Searching Authority for International Application No. PCT/EP2020/073749.

* cited by examiner

PIEZOELECTRIC STICK-SLIP-MOTOR AND METHOD OF CONTROLLING SAME

The present invention relates to a piezoelectric stick-slip-motor and method of controlling same.

Piezoelectric stick-slip-motors are known e.g. from US 2015/0076965, WO 2018/134637 A1 or EP 3 120 449 B1.

In the case of piezoelectric stick-slip drives, a piezoelectric actuator element is charged with a periodic voltage, in particular a high-frequency sawtooth voltage. The high-frequency expansion and contraction of the actuator element effected by the voltage is transmitted, via a friction element arranged on said actuator element, to a friction body such that the friction body is moved during a deflection of the actuator element in a stick phase, in which static friction exists between the friction element and the friction body, whereas, in a slip phase, sliding friction exists between the friction element and the friction body, such that the friction body is not driven along, or is driven along only to a very minor extent, by the movement of the friction element.

During the stick phase, the acceleration or the movement speed of the actuator element is in this case configured such that, owing to the forces that act in the frictional contact between the friction element and friction body, there is no resulting sliding friction or only negligible resulting sliding friction, such that the friction body is in any case driven along by the friction element as a result. By contrast, in the slip phase, the acceleration or movement speed of the actuator element is so high that the forces in the frictional contact between friction element and friction body are no longer sufficient for the friction element to drive the friction body along, and, owing to the inertia of the friction body, a relative movement between the friction element and friction body (that is to say sliding) occurs.

FIG. 1 as enclosed herewith shows two cycles of a typical cyclic stick-slip driving signal according to the state of the art in a diagram of voltage over time, wherein phase 1 represents the Move or Stick phase, phase 2 represents the Pause after move, phase 3 represents the Slip phase and phase 4 represents the Pause after slip. Vb is the base voltage, Vp is the peak voltage and dV/dt is the gradient of increasing the drive voltage from the base voltage Vb to the peak voltage Vp in phase 1 of the cycle C.

Phase 3 ("Slip phase") needs to be as short as possible (typically <2 µs) and phases 2 and 4 ("Pause after move" and "Pause after slip") are typically between 3 and 10 µs. Pause times too short or too long negatively affect the efficiency of the motor, resulting in a slight reduction of speed.

The effective speed of the motor is mainly determined by the frequency of the signal and the peak voltage. Since phases 2 ("Pause after move"), 3 ("Slip phase") and 4 ("Pause after slip") are relatively constant, the frequency of the signal is determined mainly by the duration of the move phase.

In a typical stick-slip controller, the peak voltage Vp is kept constant and the motor speed is controlled by the frequency of the signal. In doing so, during acceleration, deceleration and low velocities, the piezo motor has to operate at lower, audible frequencies. This causes the stick-slip motor and thus the motion device to generate an audible noise. During closed loop, this noise can be particularly disturbing to the user as the servo loop constantly changes frequency to compensate for the varying following error.

Some controllers try to avoid the noise generation by operating only at a high frequency, typically 20 kHz. This method though does not allow for acceleration, deceleration or lower speeds, a major limitation. But, when operating in closed loop, the frequency still has to change and this frequency modulation still generates a disturbing sound.

It is the object of the invention to enable speed variation of a piezoelectric stick-slip-motor with a reduced noise generation.

The object of the invention is solved by the method of claim 1. Preferred embodiments are claimed in the sub-claims.

The method of controlling a piezoelectric stick-slip-motor according to claim 1 comprises the following steps:

Step A: applying to the motor a cyclic sawtooth-waveform drive voltage signal with a constant frequency in which the drive voltage increases to and decreases from a peak voltage for operating the motor with a constant speed;

Step B: changing the motor speed by gradually increasing or decreasing the gradient of increasing the drive voltage to the peak voltage with each subsequent sawtooth-waveform drive voltage signal cycle while keeping the frequency of the drive voltage signal constant.

With this motor control, a speed variation of the piezoelectric stick-slip-motor can be achieved without significant noise generation since the frequency of the drive voltage signal remains constant and only the gradient of ramping up the drive signal voltage to the peak voltage changes.

It may prove advantageous if each sawtooth-waveform drive voltage signal cycle in Step A comprises the following phases:

- a first phase representing a stick (move) phase in which the drive voltage increases from a base voltage to the peak voltage,
- a second phase representing a pause after the first phase in which the drive voltage is maintained at the peak voltage,
- a third phase representing a slip phase in which the drive voltage decreases from the peak voltage to the base voltage, wherein preferably the third phase lasts 2 µs or less, and
- a fourth phase representing a pause after the third phase in which the drive voltage is maintained at the base voltage, wherein preferably the fourth phase lasts between 3 and 10 µs.

Such drive voltage signal cycle is pertinent for operating piezoelectric stick-slip motors.

It may improve the operation characteristics of the piezoelectric stick-slip motor if Step B includes gradually increasing or decreasing the peak voltage for each subsequent drive voltage signal cycle, preferably until the peak voltage passes a threshold voltage level at which the motor starts or stops operating, respectively. By gradually decreasing the gradient of increasing the drive voltage to the peak voltage with each subsequent sawtooth-waveform drive voltage signal cycle, the motor can be smoothly decelerated and stopped. By gradually increasing the gradient of increasing the drive voltage to the peak voltage with each subsequent sawtooth-waveform drive voltage signal cycle, the motor can be smoothly started and accelerated.

It may also enhance the operation performance of the piezoelectric stick-slip motor if the claimed method includes keeping the gradient of increasing and/or the gradient of decreasing the drive voltage between the base voltage and the peak voltage constant within each drive voltage signal cycle in Step A and/or Step B.

The operation performance of the piezoelectric stick-slip motor can be further improved if, for decelerating the motor speed, Step B includes at least one of the following sub-steps of modifying the sawtooth-waveform drive voltage signal as compared to Step A:

Sub-Step B1: gradually decreasing the gradient of increasing the drive voltage to the peak voltage with each subsequent sawtooth-waveform drive voltage signal cycle while maintaining the peak voltage constant so as to extend the first phase while shortening the second phase to the same amount for compensating the extension of first phase.

Sub-Step B2: gradually decreasing the peak voltage as well as the gradient of increasing the drive voltage to the peak voltage with each subsequent sawtooth-waveform drive voltage signal cycle so as to extend the first phase while eliminating the second phase and possibly shortening the third phase for compensating the extension of first phase.

In step B1, the reduction of the gradient of increasing the drive voltage to the peak voltage takes place by extending phase 1 without a reduction of the peak voltage, wherein the extension of phase 1 is compensated by shortening phase 2 to the same amount. In step B2, phase 1 is extended to become longer than phases 1 and 2 of Step A in combination, so that the phase 2 is completely skipped and phase 3 directly follows on phase 1.

It may also enhance the operation performance of the piezoelectric stick-slip motor if the claimed method includes keeping the gradient of decreasing the drive voltage from the peak voltage to the base voltage constant for each subsequent drive voltage signal cycle in Step A and/or Step B.

It may further improve the operation performance of the piezoelectric stick-slip motor if the claimed method includes maintaining the time period of the fourth phase constant for each subsequent drive voltage signal cycle in Step A and/or Step B.

It may avoid the noise generation of the piezoelectric stick-slip motor if the cyclic sawtooth-waveform drive voltage signal is applied to the motor with a constant frequency of 20 kHz or more.

It may still further improve the operation performance of the piezoelectric stick-slip motor if the claimed method includes maintaining the base voltage constant for each subsequent drive voltage signal cycle in Step A and/or Step B.

The speed control and positional precision of the piezoelectric stick-slip motor may be improved if the claimed method includes operating the motor in closed loop and/or in servo loop.

It may advantageously affect the operation characteristics of the piezoelectric stick-slip motor if the claimed method includes adjusting the peak voltage in real time at the servo clock rate.

Another aspect disclosed herein relates to a piezoelectric stick-slip-motor, comprising an element to be driven and a stator, said stator having a friction element, a controller and at least one piezoelectric actuator that is configured to deform upon application of a drive voltage signal from the controller so as to impart a movement to the friction element in order to drive the element to be driven by stick-slip-contact, wherein the controller is configured to perform the method according to one of the preceding claims.

Still further preferred embodiments result from combinations of the features disclosed in the claims, drawings and description.

DETAILED DESCRIPTION OF THE PREFERRED EMBODIMENTS

A piezoelectric stick-slip-motor according to the present application comprises an element to be driven and a stator, said stator having a friction element, a controller and at least one piezoelectric actuator that is configured to deform upon application of a drive voltage signal from the controller so as to impart a movement to the friction element in order to drive the element to be driven by stick-slip-contact. The controller is configured to perform the method according to one of the appended claims, as will be described below.

The claimed method basically enables speed variation of the piezoelectric stick-slip-motor while eliminating the noise generation by keeping the motor driving signal at a constant high frequency and varying the peak voltage of the signal.

The method includes the following steps:

Step A: applying to the motor a cyclic sawtooth-waveform drive voltage signal with a constant frequency in which the drive voltage V increases to and decreases from a peak voltage Vp for operating the motor with a constant speed;

Step B: changing the motor speed by gradually increasing or decreasing the gradient dV/dt of increasing the drive voltage V to the peak voltage Vp with each subsequent sawtooth-waveform drive voltage signal cycle C while keeping the frequency of the drive voltage signal constant.

The motor is preferably controlled in closed loop, wherein the servo loop changes the peak voltage with high resolution in real time, at the servo clock rate.

During acceleration of the piezoelectric stick-slip-motor, the gradient dV/dt of increasing the drive voltage V to the peak voltage Vp is gradually increased such that it is greater in a second drive voltage signal cycle C as compared to a first drive voltage signal cycle C, and greater in a third drive voltage signal cycle C as compared to the second drive voltage signal cycle C.

During deceleration of the piezoelectric stick-slip-motor, the gradient dV/dt of increasing the drive voltage V to the peak voltage Vp is gradually decreased such that it is smaller in a second drive voltage signal cycle C as compared to a first drive voltage signal cycle C, and smaller in a third drive voltage signal cycle C as compared to the second drive voltage signal cycle C.

Figure 3:
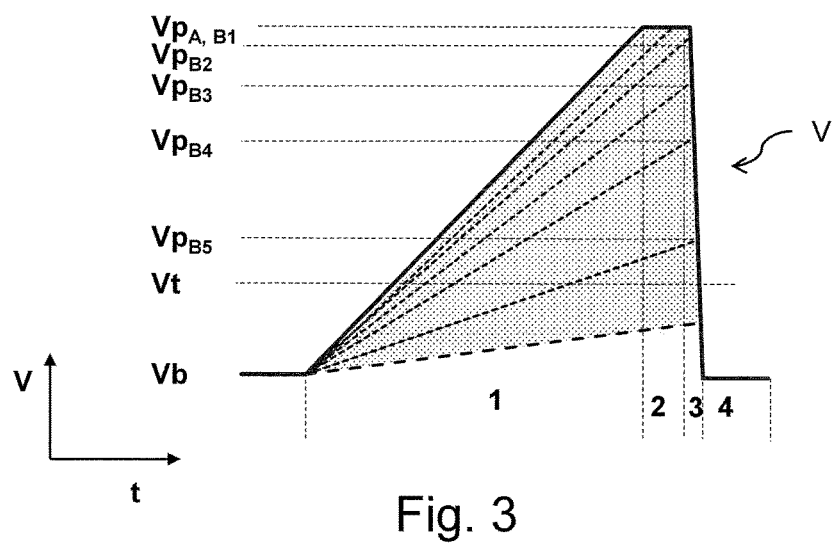
FIG. 3: shows the shape of a stick-slip sawtooth-waveform drive voltage signal according to the claimed invention, wherein phases 3 ("Slip phase") and 4 ("Pause after slip") remain relatively constant while phase 2 ("Pause after move") is being absorbed by phase 1 ("Move phase"). The loss of phase 2 ("Pause after move") causes a reduction of the motor efficiency which adds to the desired reduction of speed.

Deceleration of the piezoelectric stick-slip-motor is described below in context with FIG. 3:

As schematically shown with a solid line in FIG. 3 (the cyclic sawtooth-waveform drive voltage signal in steps A and B are superposed in FIG. 3), the sawtooth-waveform drive voltage signal cycle C in Step A comprises:

a first phase 1 representing a stick/move phase in which the drive voltage V increases from a base voltage Vb to the peak voltage Vb, a second phase 2 representing a pause after the first phase 1 in which the drive voltage V is maintained at the peak voltage Vp, a third phase 3 representing a slip phase in which the drive voltage V decreases from the peak voltage Vp to the base voltage Vb, and a fourth phase 4 representing a pause after the third phase 3 in which the drive voltage V is maintained at the base voltage Vb.

The cyclic sawtooth-waveform drive voltage signal is typically applied to the motor 1 with a constant frequency of 20 kHz or more. In this example, the third phase 3 lasts 2 µs or less, wherein the fourth phase 4 lasts between 3 and 10 µs.

For decelerating the motor speed, Step B particularly includes the following sub-steps of modifying the sawtooth-waveform drive voltage signal as compared to Step A:

Sub-Step B1: gradually decreasing the gradient dV/dt of increasing the drive voltage V to the peak voltage Vp with each subsequent sawtooth-waveform drive voltage signal cycle C while maintaining the peak voltage Vp constant so as to extend the first phase 1 while shortening the second phase 2 to the same amount for compensating the extension of first phase 1. As shown with dashed lines in FIG. 3, the gradient dV/dt in phase 1 of a Step B cycle is less than the gradient dV/dt in phase 1 of a Step A cycle. The peak voltage VpB1 of the first cycle in step B is the same as the peak voltage VpA in Step A.

Sub-Step B2: gradually decreasing the peak voltage Vp as well as the gradient dV/dt of increasing the drive voltage V to the peak voltage Vp with each subsequent sawtooth-waveform drive voltage signal cycle C so as to extend the first phase 1 while eliminating the second phase 2 and shortening the third phase 3 for compensating the extension of first phase 1. As shown in FIG. 3, the gradient dV/dt in phase 1 and peak voltage VpB2 of the second cycle in step B are less than the gradient dV/dt in phase 1 and the peak voltage VpB1 of the first cycle in step B, respectively. Moreover, the gradients dV/dt in phase 1 as well as the peak voltages VpB3, VpB4 and VpB5 are gradually decreasing with each subsequent sawtooth-waveform drive voltage signal cycle C until the peak voltage VpB5 (under)passes a threshold voltage level Vt at which the motor 1 stops operating.

In essence, the peak voltage Vp as well as the gradient dV/dt of increasing the drive voltage V to the peak voltage Vp are changed from one sawtooth-waveform drive voltage signal cycle C to another. However, throughout each drive voltage signal cycle C in Step A and Step B, the gradient dV/dt of increasing the drive voltage V from the base voltage Vp to the peak voltage Vb and the gradient dV/dt of decreasing the drive voltage V from the peak voltage Vp to the base voltage Vb are constant. Moreover, the base voltage Vb and the time period of the fourth phase 4 are constant for each subsequent drive voltage signal cycle in Step A and Step B.

Figure 1:
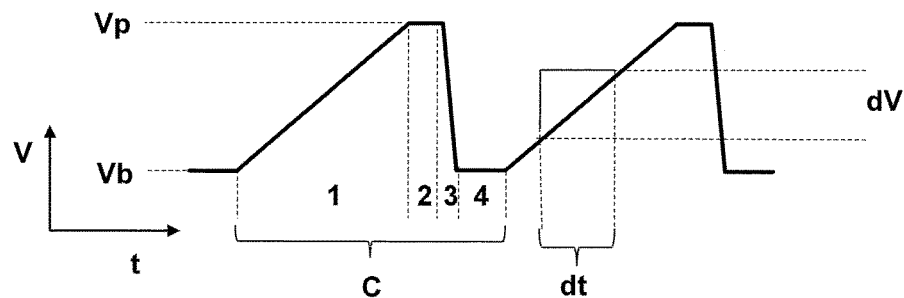
FIG. 1 shows the shape of a typical stick-slip sawtooth-waveform drive voltage signal throughout two consecutive drive voltage signal cycles.
Figure 2:
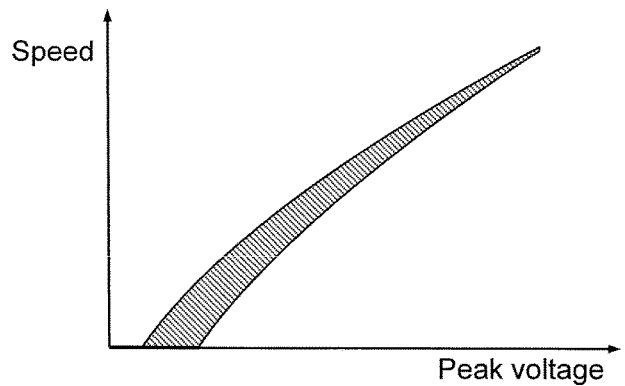
FIG. 2 shows a diagram indicating the relation between the peak voltage and speed, according to which the speed is not directly proportional with the peak voltage. Below a certain peak voltage value, the motor will stop generating a motion. The relationship between the peak voltage and speed cannot be accurately defined.

As shown in FIG. 2, the motor speed is not directly proportional with the peak voltage. Below a certain Peak voltage value, the motor will stop generating a motion. The relationship between the two cannot be accurately defined.

This does not present a problem in closed loop as the servo loop will adjust the peak voltage Vp to the needed value to generate the desired speed. The slope or gradient dV/dt in phase 1 ("Move phase") is adjusted in real time at the servo clock rate, from the ideal shape needed for high speed to a low value at which the motor stops moving.

In Step B, phase 3 ("Slip phase") and phase 4 ("Pause after slip") remain relatively constant while phase 2 ("Pause after move") is being absorbed by phase 1 ("Move phase"). The loss of the phase 2 ("Pause after move") causes a reduction of the motor efficiency, which adds to the desired reduction of speed.

REFERENCE SIGNS

1 First phase (of drive voltage signal cycle)
2 Second phase (of drive voltage signal cycle)
3 Third phase (of drive voltage signal cycle)
4 Fourth phase (of drive voltage signal cycle)
C Drive voltage signal cycle
dV Voltage increment
dt Time increment
t Time
V Drive voltage
Vb Base voltage
Vp Peak voltage
Vt Threshold voltage

The invention claimed is:

1. A method of controlling a piezoelectric stick-slip motor, the method comprising:
 a. Step A: applying to the piezoelectric stick-slip motor a cyclic sawtooth-waveform drive voltage signal with a constant frequency in which a drive voltage (V) increases to and decreases from a peak voltage (Vp) for operating the piezoelectric stick-slip motor with a constant speed; and
 b. Step B: changing a piezoelectric stick-slip motor speed by gradually increasing or decreasing a gradient (dV/dt) of increasing the drive voltage (V) to the peak voltage (Vp) with each subsequent sawtooth-waveform drive voltage signal cycle (C) while keeping a frequency of the cyclic sawtooth-waveform drive voltage signal constant.

2. The method according to claim 1, wherein each sawtooth-waveform drive voltage signal cycle (C) in the Step A comprises the following phases:
 a. a first phase (1) representing a stick (move) phase in which the drive voltage (V) increases from a base voltage (Vb) to the peak voltage, (Vp);
 b. a second phase (2) representing a pause after the first phase (1) in which the drive voltage (V) is maintained at the peak voltage (Vp);
 c. a third phase (3) representing a slip phase in which the drive voltage (V) decreases from the peak voltage (Vp) to the base voltage (Vb); and
 d. a fourth phase (4) representing a pause after the third phase (3) in which the drive voltage (V) is maintained at the base voltage (Vb).

3. The method according to claim 1, wherein the Step B further comprises: gradually increasing or decreasing the peak voltage (Vp) for each subsequent drive voltage signal cycle.

4. The method according to claim 1, comprising: keeping the gradient (dV/dt) of increasing and/or the gradient (dV/dt) of decreasing the drive voltage (V) between the base voltage (Vb) and the peak voltage (Vp) constant within each drive voltage signal cycle (C) in the Step A and/or the Step B.

5. The method according to claim 2, wherein for decelerating the piezoelectric stick-slip motor speed, the Step B further comprises at least one or more of the following sub-steps of modifying the cyclic sawtooth-waveform drive voltage signal as compared to the Step A:
 a. Sub-Step B1: gradually decreasing the gradient (dV/dt) of increasing the drive voltage (V) to the peak voltage (Vp) with each subsequent sawtooth-waveform drive voltage signal cycle (C) while maintaining the peak voltage (Vp) constant so as to extend the first phase (1) while shortening the second phase (2) to a same amount for compensating the extension of first phase (1); and/or b. Sub-Step B2: gradually decreasing the peak voltage (Vp) as well as the gradient (dV/dt) of increasing the drive voltage (V) to the peak voltage (Vp) with each subsequent sawtooth-waveform drive voltage signal cycle (C) so as to extend the first phase (1) while eliminating the second phase (2) and possibly shortening the third phase (3) for compensating the extension of first phase (1).

6. The method according to claim 1, comprising: keeping the gradient (dV/dt) of decreasing the drive voltage (V) from the peak voltage (Vp) to the base voltage (Vb) constant for each subsequent drive voltage signal cycle (C) in the Step A and/or the Step B.

7. The method according to claim 2, comprising: maintaining the time period of the fourth phase (4) constant for each subsequent drive voltage signal cycle in the Step A and/or the Step B.

8. The method according to claim 1, comprising: applying to the piezoelectric stick-slip motor the cyclic sawtooth-waveform drive voltage signal with a constant frequency of 20 kHz or more.

9. The method according to claim 1, comprising: maintaining the base voltage (Vb) constant for each subsequent drive voltage signal cycle in the Step A and/or the Step B.

10. The method according to claim 1, comprising: operating the piezoelectric stick-slip motor in closed loop and/or in servo loop.

11. The method according to claim 10, comprising: adjusting the peak voltage (Vp) in real time at a servo clock rate.

12. The method according to claim 2, wherein: the third phase (3) lasts 2 ps or less; and the fourth phase (4) lasts between 3 and 10 ps.

13. The method according to claim 3, comprising: gradually increasing or decreasing the peak voltage (Vp) for each subsequent drive voltage signal cycle, preferably until the peak voltage (Vp) passes a threshold voltage level (Vt) at which the piezoelectric stick-slip motor starts or stops operating, respectively.

14. The method according to claim 2, wherein the Step B comprises: gradually increasing or decreasing the peak voltage (Vp) for each subsequent drive voltage signal cycle.

15. The method according to claim 14, comprising: keeping the gradient (dV/dt) of increasing and/or the gradient (dV/dt) of decreasing the drive voltage (V) between the base voltage (Vb) and the peak voltage (Vp) constant within each drive voltage signal cycle (C) in the Step A and/or the Step B.

16. The method according to claim 15, wherein for decelerating the piezoelectric stick-slip motor speed, the Step B further comprises at least one or more of the following sub-steps of modifying the cyclic sawtooth-waveform drive voltage signal as compared to the Step A:

a. Sub-Step B1: gradually decreasing the gradient (dV/dt) of increasing the drive voltage (V) to the peak voltage (Vp) with each subsequent sawtooth-waveform drive voltage signal cycle (C) while maintaining the peak voltage (Vp) constant so as to extend the first phase (1) while shortening the second phase (2) to a same amount for compensating the extension of first phase (1); and/or b. Sub-Step B2: gradually decreasing the peak voltage (Vp) as well as the gradient (dV/dt) of increasing the drive voltage (V) to the peak voltage (Vp) with each subsequent sawtooth-waveform drive voltage signal cycle (C) so as to extend the first phase (1) while eliminating the second phase (2) and possibly shortening the third phase (3) for compensating the extension of first phase (1).

17. The method according to claim 16, comprising: keeping the gradient (dV/dt) of decreasing the drive voltage (V) from the peak voltage (Vp) to the base voltage (Vb) constant for each subsequent drive voltage signal cycle (C) in the Step A and/or the Step B.

18. The method according to claim 17, comprising: maintaining the time period of the fourth phase (4) constant for each subsequent drive voltage signal cycle in the Step A and/or the Step B.

19. The method according to claim 18, comprising: applying to the piezoelectric stick-slip motor the cyclic sawtooth-waveform drive voltage signal with a constant frequency of 20 kHz or more.

20. A piezoelectric stick-slip motor, comprising:
an element to be driven; and
a stator, said stator having a friction element, a controller and at least one piezoelectric actuator that is configured to deform upon application of a drive voltage signal from the controller so as to impart a movement to the friction element in order to drive the friction element to be driven by a stick-slip contact, wherein the controller is configured to perform computer-implemented functions of:

a. Step A: applying to the piezoelectric stick-slip motor a cyclic sawtooth-waveform drive voltage signal with a constant frequency in which a drive voltage (V) increases to and decreases from a peak voltage (Vp) for operating the piezoelectric stick-slip motor with a constant speed; and b. Step B: changing a motor piezoelectric stick-slip speed by gradually increasing or decreasing a gradient (dV/dt) of increasing the drive voltage (V) to the peak voltage (Vp) with each subsequent sawtooth-waveform drive voltage signal cycle (C) while keeping a frequency of the cyclic sawtooth-waveform drive voltage signal constant.

* * * * *